United States Patent
Wood et al.

(10) Patent No.: US 8,858,857 B2
(45) Date of Patent: Oct. 14, 2014

(54) PROCESS FOR THE RAPID FABRICATION OF COMPOSITE GAS CYLINDERS AND RELATED SHAPES

(76) Inventors: Geoffrey Michael Wood, North Saanich (CA); Pamela M. Schneider, Independence, KY (US); Steven C. Stenard, Cincinnati, OH (US)

( * ) Notice: Subject to any disclaimer, the term of this patent is extended or adjusted under 35 U.S.C. 154(b) by 1409 days.

(21) Appl. No.: 12/046,716

(22) Filed: Mar. 12, 2008

(65) Prior Publication Data

US 2008/0264551 A1 Oct. 30, 2008

Related U.S. Application Data

(60) Provisional application No. 60/906,282, filed on Mar. 12, 2007.

(51) Int. Cl.
```
B29C 49/20    (2006.01)
B29C 35/04    (2006.01)
B29C 70/40    (2006.01)
B29C 70/44    (2006.01)
D04C 1/06     (2006.01)
F17C 1/00     (2006.01)
B29C 35/02    (2006.01)
B29C 49/64    (2006.01)
B29L 31/00    (2006.01)
```

(52) U.S. Cl.
CPC ....... *B29C 70/443* (2013.01); *B29C 2049/2008* (2013.01); *B29C 35/0288* (2013.01); *B29C 49/6472* (2013.01); *B29C 49/20* (2013.01); *F17C 1/005* (2013.01); *B29C 35/045* (2013.01); *B29C 2049/2047* (2013.01); *B29L 2031/7156* (2013.01); *B29C 49/6409* (2013.01); *B29C 70/446* (2013.01); *B29L 2031/7172* (2013.01); *D04C 1/06* (2013.01)

USPC .......... 264/265; 264/103; 264/266; 264/324; 264/328.14; 264/573; 156/172; 156/173

(58) Field of Classification Search
CPC .. B29C 70/446; B29C 49/20; B29C 2049/20; B29C 2049/2008; B29C 2049/2047; B29C 49/6409; B29C 49/6472; B29C 53/602; B29C 53/821; B29C 53/822; B29C 35/0288; B29C 35/045; D04C 1/06; B29L 2031/7172; B29L 2031/7156

USPC ................. 264/257, 258, 259, 264, 265, 269, 264/328.1, 328.7, 516, 103, 266, 271.1, 264/324, 328.14, 529, 573; 220/581; 156/172, 173

See application file for complete search history.

(56) References Cited

U.S. PATENT DOCUMENTS 3,228,549 A    1/1966   Courtney
3,260,398 A    7/1966   Levenetz (Continued)

*Primary Examiner* — Atul P. Khare
(74) *Attorney, Agent, or Firm* — Hahn Loeser & Parks LLP

(57) ABSTRACT

A method of fabricating a composite vessel encompassing rapid manufacturing that is applicable to composite hydrogen and other gas storage tanks, both for high-pressure cylinders, as well as low-pressure conformal tanks. The process of fabrication includes using a liner, of metal or plastic materials, over which a braided or developed preform is wrapped. The dry fiber wrapped liner is placed in a mold and resin injected into the cavity formed between the liner and the mold outer walls. The liner is flooded with heated and/or cooled pressurized fluid thus enabling complete and independent process control from within the liner for both the resin injection and the cure phases. Fiber placement control is determined through combined biaxial and triaxial braid/preform design, and by wrapping at controlled tension onto the supporting liner. Fiber tension control is further enhanced by the methodology of mold loading whereby tensioning forces are enacted during actual load and close. The process may use thermoset or thermoplastic resins and any of a variety of fibrous reinforcements such as carbon, boron, glass, natural, aramid or other fibers.

34 Claims, 3 Drawing Sheets

(56) References Cited

U.S. PATENT DOCUMENTS

| | | | |
|---|---|---|---|
| 3,282,757 A | 11/1966 | Brussee | |
| 3,394,738 A | 7/1968 | Baron | |
| 3,765,557 A | 10/1973 | Giwer | |
| 3,969,812 A | 7/1976 | Beck | |
| 4,123,307 A * | 10/1978 | Lemelson | 156/172 |
| 4,614,279 A * | 9/1986 | Toth et al. | 220/590 |
| 4,637,909 A * | 1/1987 | Lucca | 264/510 |
| 4,699,288 A | 10/1987 | Mohan | |
| 4,783,232 A * | 11/1988 | Carbone et al. | 156/172 |
| 4,808,362 A * | 2/1989 | Freeman | 264/257 |
| 5,025,943 A | 6/1991 | Forsman | |
| 5,152,949 A | 10/1992 | Leoni | |
| 5,287,987 A | 2/1994 | Gaiser | |
| 5,865,923 A | 2/1999 | Johnson | |
| 6,143,215 A * | 11/2000 | McCollum et al. | 264/40.1 |
| 6,171,423 B1 * | 1/2001 | Murphy et al. | 156/172 |
| 6,431,837 B1 | 8/2002 | Velicki | |
| 6,508,731 B1 | 1/2003 | Feeney | |
| 6,565,793 B1 | 5/2003 | Goldsworthy | |
| 6,660,214 B2 * | 12/2003 | LeBreton | 264/516 |
| 6,883,536 B2 | 4/2005 | Hervio | |
| 6,893,604 B2 | 5/2005 | Hauber | |
| 6,955,784 B1 * | 10/2005 | Zanella et al. | 264/516 |
| 7,090,736 B2 | 8/2006 | LeBreton | |
| 7,204,903 B2 | 4/2007 | Yasui | |
| 7,763,137 B2 * | 7/2010 | Ohta et al. | 156/172 |
| 2004/0163755 A1 * | 8/2004 | LeBreton | 156/146 |
| 2004/0222571 A1 * | 11/2004 | Steffier | 264/602 |
| 2005/0077643 A1 * | 4/2005 | Matsuoka | 264/103 |
| 2005/0087537 A1 * | 4/2005 | Kimbara et al. | 220/586 |
| 2005/0258575 A1 * | 11/2005 | Kruse et al. | 264/512 |

\* cited by examiner

PROCESS FOR THE RAPID FABRICATION OF COMPOSITE GAS CYLINDERS AND RELATED SHAPES

This application claims the benefit of U.S. Provisional Applications No. 60/906,282, filed Mar. 12, 2007, which is herein incorporated by reference in its entirety.

FIELD OF THE INVENTION

This invention relates to the art of fabricating composite hollow structures with internal liners; more particularly, to improved methods of manufacture of composite pressure vessels for storage of hydrogen and natural gas, specifically with respect to improvements focused towards high-rate manufacturing methodology.

BACKGROUND OF THE INVENTION

The primary issues associated with implementation of fuel cell vehicles and the like are in manufacturing components at rates compatible with vehicle production, and at costs that can be borne by the consumer and industry. Current high-pressure storage cylinders need to be carbon composite due to the weight penalty associated with metallic tanks. However, current state-of-the-art in composite cylinder production relies on filament winding of either wet fiber tows, or of a pre-preg fiber with pre-impregnated resins (typically epoxy or possibly other thermoset and some thermoplastic resins.) These are wound onto a liner with precise control of fiber orientation to allow optimum stress fields, and the overall wound cylinder is typically placed in an oven or autoclave and cured for some period of time. The typical process sequence can take from 4-8 hours per cylinder, and for example, as referenced by Iida et al (U.S. Pat. No. 6,190,481) a cure time of over 6 hours was demonstrated for tank manufacture. The state of the art is further reflected in patent literature such as Goldsworthy et al (U.S. Pat. No. 6,565,793) and more recently Iida et al (U.S. Pat. No. 7,032,769).

In order to be compatible with vehicle production rates, a process that is approximately 20 minutes or less is desirable. In the above referenced state-of-the-art, from 12 to 24 different tools and process lines are necessary for the parallel processing required to reach 20 minute product cycle times. This is capital, labor, and space intensive, and is not optimum for real-world production requirements. The current status has been verified by recent private communication with a major automotive manufacturer.

Attempts have been made to modify other composite processes to take advantage of faster cycle time, including using resin transfer molding into a dry-fiber preform which is filament wound onto a cylinder liner. The issues with these approaches have come from holding appropriate tension on the fibers after wrapping, with holding net-shape on the carbon wrapped liner so that mold closure does not wrinkle the carbon fibers and thus knock down the properties to unacceptable levels, and with rapid and repeatable injection processes. The latter is a key factor as the existing systems have typically used heat and pressure transfer via the mold external surface, and utilizing pressure control via injection pressure of the resin.

SUMMARY OF THE INVENTION

The invention utilizes a formed liner which is overwrapped with a dry fiber fabric preform or braid. Tension control is incorporated through use of a tri-axial form of material such that tension can be developed in the preform without deformation. The wrapped liner is loaded into a mold cavity defining the outer shape of the part to be made. The loading operation incorporates rotation of the liner and fiber preform such that the tension on the preform is improved and is coordinated with tool closing to effectively eliminate any undesirable possibility of wrinkling of the preform.

The liner is connected to process controls capable of delivering heat and cooling as well as pressure to the inside of the liner via fluid systems. The capability to control the process from the internal liner side is used during the subsequent resin transfer molding operation. Resin is injected into the dry fiber preform occupying the cavity between mold wall and liner. The temperatures and pressures are capable of being set at optimum for the injection cycle, with rapid thermal response from the liner process fluid systems and pressure balance as provided by the liner internal fluid preventing collapse of the liner. Additionally, vibration and other pulse based injection process aids can be accomplished through fluid excitation in the liner.

Once resin injection is completed at the conditions chosen for resin viscosity and flow control, the liner internal fluid system is switched to provide optimum thermal and pressure settings for cure of the resin. In this manner, complete separation of the resin viscosity profile for injection and for cure are attained, and as evident to any practiced in the art, the overall process cycle can be optimized. Additionally, the pressure conditions developed in the resin can be selected for achieving properties desirable in the final part. On final cure the part may be cooled as desired via internal cooling through the liner, and thus the demolding cycle can be accelerated as well.

DESCRIPTION OF THE DRAWINGS

A brief description of the drawings indicates the process methodology developed herein.

The cylinder liner, fabricated with double-ended threaded connections, is placed on a mandrel and a direct wrap of fiber is applied, FIG. 1. In the first embodiment of the invention, a braided carbon fiber material is used; however either stitched or woven fabric forms may be used as long as the correct fiber architecture can be accommodated.

Figure 1:
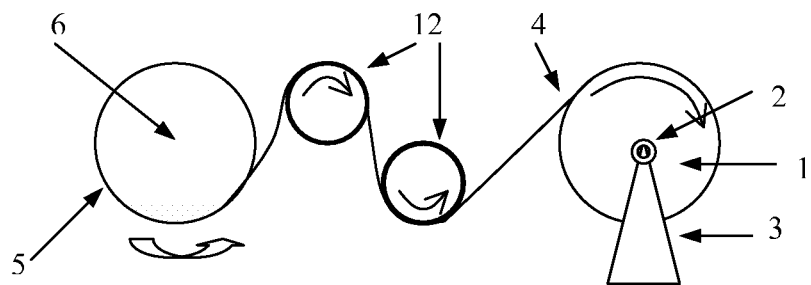
Figure 2:
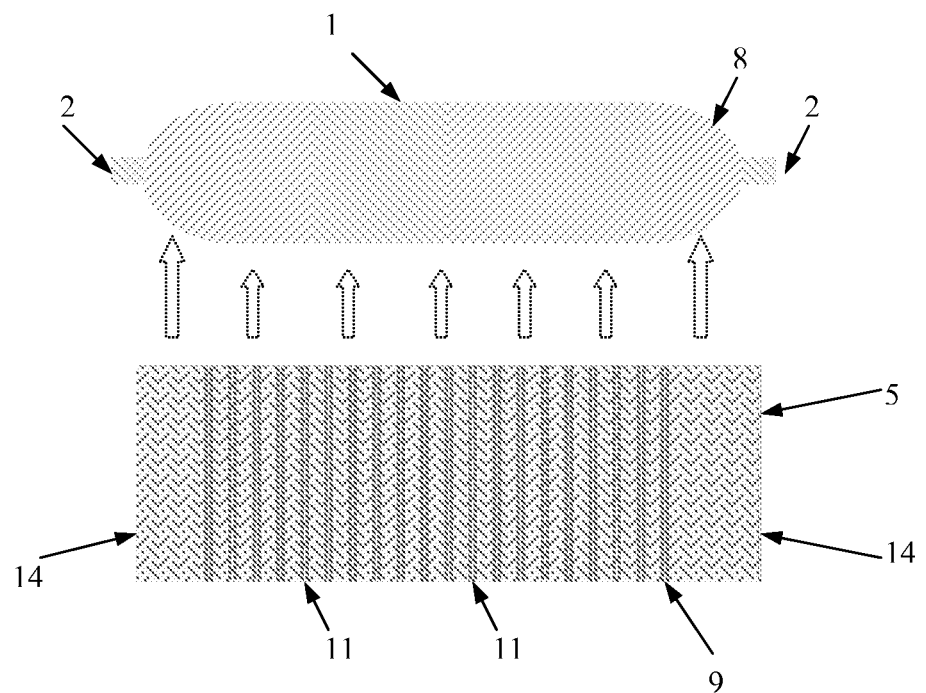

In the first embodiment and as applicable to pressure cylinders specifically, the braid is a combination of tri-axial format and bi-axial format as shown in FIG. 2. The fiber architecture required for achieving design properties can be developed in this way. The bi-axial fibers conform to the end-dome design and the use of longitudinal fibers allows tension to be held in the fabric without distortion.

Figure 3:
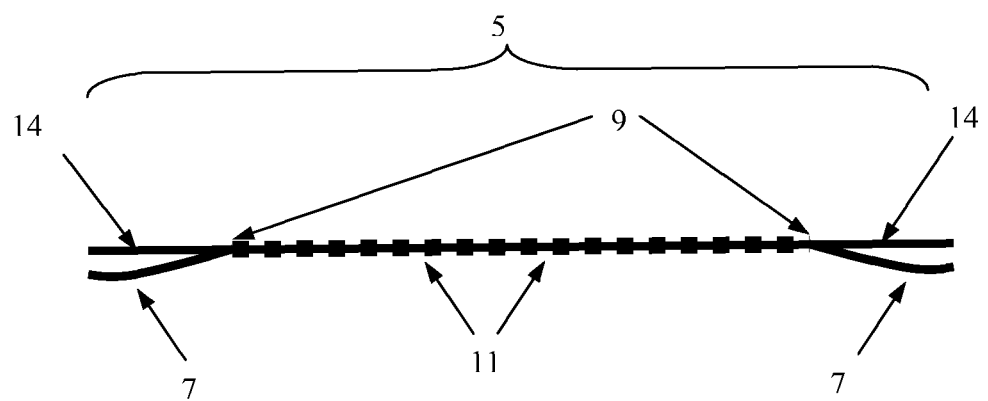

FIG. 3 shows an additional strip of bi-axial fibers stitched onto the wide format braid to allow build-up of additional thickness on the tank ends, as well as to mitigate the effect of changing thickness of the fabric where the uni-directional fibers stop.

Figure 4:
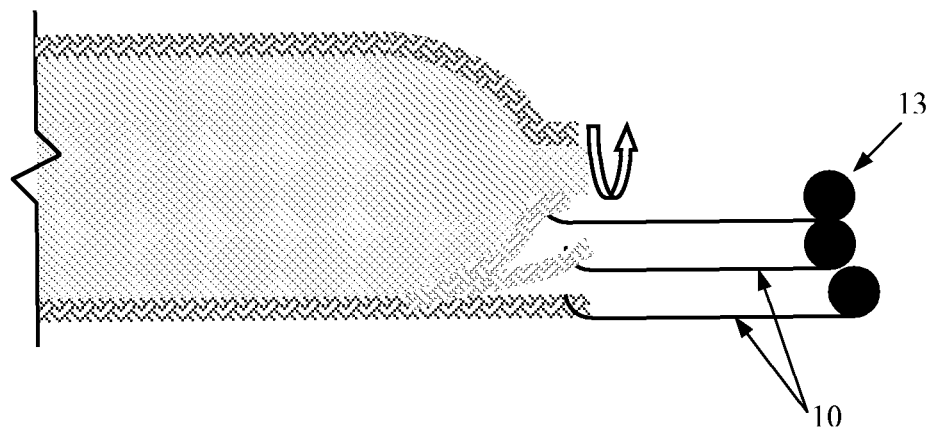

FIG. 4 shows one embodied method of drawing the braid down to the tank ends and using a pick system.

Figure 5:
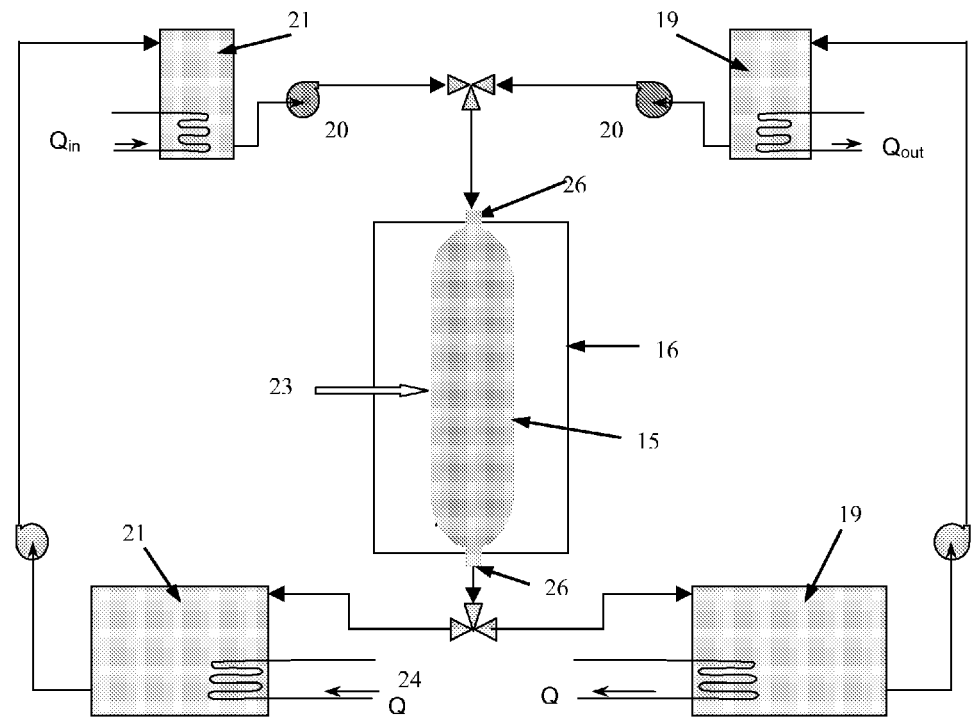

FIG. 5 shows the schematic for achieving process control over thermal and pressure conditions from the liner outwards during the resin injection and cure process.

Figure 6:
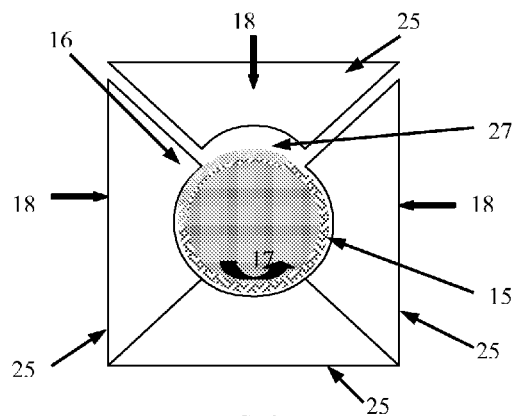

FIG. 6 shows the method of tool load and tension control during the mold closing operation.

DETAILED DESCRIPTION OF THE EMBODIMENTS

The following discussion of the embodiments of the invention directed to a rapid manufacturing process for a compressed hydrogen tank is merely exemplary in nature, and is in no way intended to limit the invention or its applications or uses. However, as will be appreciated by those skilled in the art, the process has application to produce tanks other than compressed hydrogen tanks and to produce structures with liners applicable in a number of fields utilizing composites as the preferred material.

An invention is developed which consists of several process steps, intricately linked, in which no single step is more than 10-20 minutes in total cycle time, thereby resulting in a part fully completed coming off each line every 10-20 minutes.

A cylinder liner 1 is formed through one of several options, using either superplastic forming of metal pipe with threaded ends, spin forming of cylinders from metal sheet or tubing, or plastic blow-molding or injection molding to form plastic liners. In the case of using plastic liners, an additive may preferably be used to allow higher thermal conductivity than with current plastic systems, and these additives, which are well known in the industry and include nano-particulates of conductive materials, or chain forming additives to preferentially conduct heat. Plastic formulations are incorporated herein that include carbon nanotube modified plastics that have high thermal conductivities as compared to unmodified materials.

The cylinder liner 1, fabricated with double-ended threaded connections 2, is then placed on a mandrel support 3 and direct wraps of fiber 4 are applied. In the first embodiment of the invention, a braided carbon fiber material 5 is used, however either stitched or woven fabric forms may be used as long as the correct fiber architecture can be accommodated. The braided material lends itself ideally to this application for high pressure hydrogen storage cylinders as braid fiber architectures have naturally high permeability for the resin transfer molding's resin injection cycle, and they can be made with the necessary blend of fibers for hoop and axial stresses for the cylinder performance. The braided material is supplied in spools 6 from a common source braider, which allows the braider to be in production full time and operate separately from the tank liner 1 wrapping operation.

This application is unique to the industry, and the process has several advantages, which include: (A) The braid can be made in a tubular form with bi-axial and unidirectional fibers located in the appropriate places for tank stress design optimization as demonstrated in 5; (B) An additional strip of bi-axial fibers 7 can be stitched onto the wide format braid 5 to allow build-up of additional thickness for the tank ends 8, as well as to mitigate the effect of changing thickness of the fabric where the uni-directional fibers stop 9 (eliminating a step change in thickness that exert effects on stress concentrations in the pressurized tanks); (C) The braided material 5 will effectively place a double layer of material down at once as the braided tubular sock 5 will be layed flat onto the liner 1 thereby improving production rates; (D) The end-contours can be accommodated by the bi-axial braid deformed with fiber shearing through an automatic process using fingers 10, which are attached to cams 13 to draw down and contour to end-domes, and the fiber ends sealed down by use of a local sealing method, such as adhesive tacking or other process as common in the industrial practice, and this method thereby allows precise end-contouring and thickness control of the material preform; (E) The uni-directional fibers 11 allow the braid to be held under tension during the application. The tension control is effected through tensioning drag devices 12. Having controlled and precise tension thereby controls the laminate net thickness, and this restraint afforded by the uni-directional fibers 11 prevents the cylinder end wraps 14 from becoming stretched and wrinkling or moving off-plane from the desired fiber application location; (F) The bi-axial fibers can be tailored during the braiding process to optimize the fiber location and orientation, reducing materials application and cost of the tanks; (G) The floor area required for the fiber application process is exceptionally small compared to other filament winding-type operations, and does not rely on movement of either the braider or the liner as is the case of a direct braid over-wrap; (H) The system allows the braid manufacture to be separated from the braid application process, thereby fully utilizing the braider equipment in continuous production of materials and also fully utilizing the liner wrapping equipment in production of over-wrapped liners ready for molding.

A unique molding system has been developed that is a significant departure from any in the state-of-the-art today. The wrapped dry tank 15 is placed in a cavity mold 16, and is rotated 17 during mold closing 18 to draw tension in the fabric preform. This allows the part to be enclosed in the tool with no fiber pinching or deformation occurring and develops and retains tension required in the fiber, as the fabric ends 27 are drawn down and into the final cavity shape. The mold segments 25 close sequentially and the tank rotation 17 is made possible as the boss ends 2 of the tank liner 1 are exposed to the outside of the mold 16. The mold tooling is constructed of several segments 25, in the first reduction to practice three segments were used, but preferentially four segments are used to optimize mold closing operations.

The liner of the tank is flooded with heat-transfer fluid 19 through quick-release end connectors 26. The heat transfer fluid 19 has its temperature optimized for resin injection viscosity control, but still well below the reaction initiation temperature of the resin components as in the case of thermoset resins. The heat-transfer fluid 19 is pressurized 22 with pump 20 to allow use of a thin-wall liner, effectively providing internal support to the liner during resin injection. Resin injection pressure 23 can then be optimized and balanced against collapse or dimensional change of the liner 1 and hence local deformation of the fiber preform, another common problem with resin transfer molding. The fluid 19 and pressure boost pump 20 also allows for application of internal vibration assist during injection, another facet unique to the application in composite storage cylinders. This assist allows for faster injection, more rapid fiber wet-out, and enhanced release of voids in the laminate, and is achieved preferentially as a thin-walled liner is made possible through the invention and the mold does not need to transfer this vibration through the bulk of the metal tool 16.

The next stage of the process occurs upon completion of the resin injection 23. In the case of thermoset resins, a high-temperature, pressurized heat transfer fluid 21 is flooded inside the liner compartment through the same quick release fittings 26. This hot fluid provides heat to the laminate from within the liner cavity and thereby initiates the reaction of the resin components. Excess heat generated during exothermic curing of the laminate resin will be absorbed back into the heat transfer fluid 21 through the liner 1, thereby mitigating very high internal temperatures and the possibility of overheating the laminate during cure, and also mitigating some of the thermal stresses typical of cured composites. Similarly, heat loss through system components can be made up by applying external heat 24, and thus very precise and also rapidly responding process control is made possible. As desired, additional pressure 22 can be applied to the high-temperature heat transfer fluid 21 to ensure hydrostatic pressures internal to the composite laminate are retained.

On completion of the cure cycle the cold fluid 19 is returned to the liner internal cavity. This cools the now fully cured composite cylinder down to a level whereby the tool opening and part removal are accomplished as rapidly as possible. Once the temperature is reduced to an acceptable level, the part is removed and the tool is ready for the next operation.

In the case of using a thermoplastic resin, the process is adapted for a different cycle, but principals common to the plastic industry are now modified and applied in a unique environment for achieving rapid processing of fiber-reinforced cylinders. The heat transfer fluid 21 is pumped through quick release fittings 26 into the liner 1 internal cavity. This temperature is set to slightly above the melt temperature of the desired thermoplastic resin. Resin injection 23 of liquid thermoplastic resin occurs and the resin permeates the entirety of the laminate as is common in resin transfer molding, holding the internal pressure 22 and internal temperature of fluid 21 allows the process to be fully executed and the laminate completely saturated with resin. On completion of the injection, cold process fluid 19 is now passed into the liner and serves to solidify the thermoplastic resin and thus consolidate the composite laminate without needing to remove a large quantity of heat through and into the tool 16 walls. As is desired in thermoplastic molding, high pressure can be held on the laminate throughout the cooling cycle via pump 20 pressurizing the cavity 22. On acceptable cool-down the part can then be demolded and the cycle completed.

This description of the invention has thus been made clear in illustrative embodiments, and reduced to practice in a composite high-pressure storage tank comprising four layers of a braided triaxial/biaxial fabric as described herein, coupled with resin transfer molding of a thermoset resin under process control as also described herein. The individual steps of the process have been demonstrated to be practical and complete within 30 minutes, an order of magnitude improvement over the state-of-the-art of filament winding of high-pressure composite overwrapped gas storage tanks. Testing of the completed articles was undertaken and has shown capability to achieve burst pressures of over 4,000 psi in first article demonstration of the process principles. Thus, while there will now be immediately obvious to those skilled in the art many modifications of process, structure, and components as used in the practice of the invention, these invention modifications and variations can be made therein without departing from the spirit and scope of the invention as defined in the following claims.

What is claimed is:

1. A process for manufacturing a hollow composite article, the process comprising the steps of:
    forming a fiber fabric over-wrap comprising tri-axial fibers by over-wrapping a cylindrical liner with dry fiber material;
    loading the over-wrapped liner into a mold cavity defining an outer shape of the composite article, said loading being coordinated with mold closing around the over-wrapped liner so as to improve tension on the over-wrap and effectively eliminate undesired wrinkling thereof;
    activating a fluid system to flood the loaded liner with heat transfer fluid at a temperature and pressure optimized for resin injection viscosity and flow control;
    injecting resin into the mold cavity so as to saturate the over-wrap, said injecting occurring while the flooded heat transfer fluid provides internal support to the liner balancing against resin injection pressure;
    forming the composite article by switching the fluid system so as to provide a temperature and pressure of heat transfer fluid fully curing the injected resin; and
    removing the composite article from the mold cavity.

2. The process of claim 1, wherein said fiber material comprises carbon, boron, glass, natural, or aramid fibers.

3. The process of claim 1, wherein the over-wrap is a braided material.

4. The process of claim 3, wherein the braided material has an added layer stitched in place to develop variable local thickness.

5. The process of claim 1, wherein the over-wrap is a stitched or woven material.

6. The process of claim 1, wherein the over-wrap is a filament wound tow material.

7. The process of claim 1, wherein the over-wrap also comprises bi-axial fibers.

8. The process of claim 7, wherein the liner comprises end contours which are over-wrapped with said bi-axial fibers, and wherein a cylindrical portion of the liner is over-wrapped with said tri-axial fibers.

9. The process of claim 1 wherein the over-wrap comprises uni-directional fibers facilitating application of tension to the over-wrap.

10. The process of claim 1, further comprising conducting said over-wrapping with tension control over said dry fiber material.

11. The process of claim 1, wherein the liner independently supports said over-wrapping of fiber material.

12. The process of claim 1, further comprising pressurizing the liner by an internal fluid during said over-wrapping so as to provide support to said fiber material.

13. The process of claim 1, wherein the liner is placed on a mandrel support during said over-wrapping.

14. The process of claim 1, wherein said injected resin is thermosetting.

15. The process of claim 14, wherein said temperature of flooded heat transfer fluid is set below a reaction initiation temperature of resin components.

16. The process of claim 15, wherein said temperature of heat transfer fluid used for curing provides heat initiating a reaction of resin components, and wherein excess heat generated during exothermic curing of the resin is absorbed back into the heat transfer fluid through the liner.

17. The process of claim 16, further comprising switching the fluid system so as to provide cold heat transfer fluid cooling the fully cured composite article.

18. The process of claim 1, wherein said injected resin is thermoplastic.

19. The process of claim 18, wherein said temperature of flooded heat transfer fluid is set slightly above a melt temperature of the resin.

20. The process of claim 19, wherein said switching provides a cold heat transfer fluid solidifying the resin.

21. The process of claim 1, further comprising applying vibration to the heat transfer fluid using an excitation pulse during said injecting, during said curing, or both.

22. The process of claim 1, wherein the liner is formed from metal.

23. The process of claim 22, wherein the liner is formed by superplastic forming or spin forming.

24. The process of claim 1, wherein the liner is formed from plastic.

25. The process of claim 24, wherein the liner is formed by blow molding or injection molding.

26. The process of claim 24, wherein plastic material of the liner is modified so as to improve thermal conductivity.

27. The process of claim 26, wherein the plastic material incorporates conductive nano-particulates, chain forming additives, and/or carbon nanotubes.

28. The process of claim 1, wherein the liner comprises end connectors.

29. The process of claim 1, wherein the liner comprises two fluid connections, and wherein heat transfer fluid is delivered into the liner using said fluid connections.

30. The process of claim 1, wherein the liner remains as an integral part of the composite article.

31. The process of claim 1, further comprising removing the liner from the composite article by melting or dissolution.

32. The process of claim 1, wherein the composite article is a compressed gas storage tank.

33. The process of claim 1, wherein the composite article is a fluid storage tank.

34. The process of claim 1, wherein said loading is conducted while rotating the over-wrapped liner so as to provide said improved tension.

\* \* \* \* \*